United States Patent [19]
Cooper

[11] 3,815,542
[45] June 11, 1974

[54] MAGNETIC PRESSURE INDICATOR

[75] Inventor: Roydon B. Cooper, Locust Valley, N.Y.

[73] Assignee: Pall Corporation, Glen Cove, N.Y.

[22] Filed: July 27, 1972

[21] Appl. No.: 275,854

[52] U.S. Cl. .................................. 116/70, 210/90
[51] Int. Cl. .......................................... G01l 19/12
[58] Field of Search .......... 116/65, 70, 117; 210/90; 73/210

[56] References Cited
UNITED STATES PATENTS

| | | | |
|---|---|---|---|
| 2,574,866 | 11/1951 | Fahrlander | 73/210 |
| 2,942,572 | 6/1960 | Pall | 116/117 |
| 3,077,176 | 2/1963 | Pall et al. | 116/70 |
| 3,077,854 | 2/1963 | Pall | 116/70 |
| 3,140,690 | 7/1964 | Siebel | 116/70 |
| 3,154,049 | 10/1964 | Smith et al. | 116/70 |
| 3,212,471 | 10/1965 | Willis | 116/70 |
| 3,623,448 | 11/1971 | Resh et al. | 116/70 |

Primary Examiner—Louis J. Capozi

[57] ABSTRACT

A magnetic differential pressure indicator is provided for detecting in a fluid system and indicating a pressure differential thereacross that is greater than a predetermined value. The magnetic indicating means is arranged to rotate about an axis after actuation, upon movement of a pressure-sensing piston towards or away from the indicating means.

20 Claims, 6 Drawing Figures

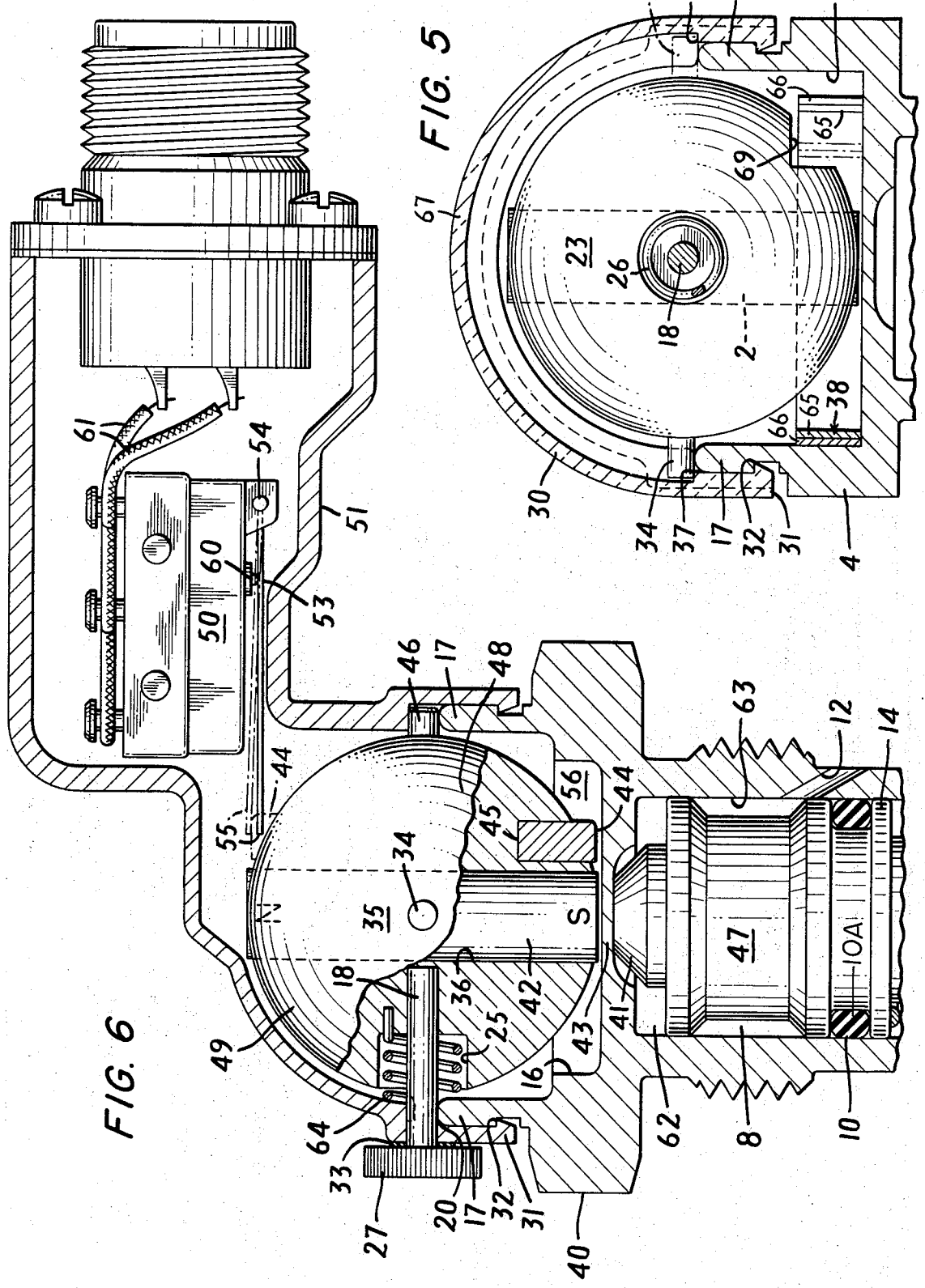

MAGNETIC PRESSURE INDICATOR

In any system wherein a fluid such as hydraulic fluid or the like is passed through a filter, it is customary to provide means for indicating when the filter element has become loaded, and requires replacement. Since the pressure drop across a filter increases in proportion to the accumulation of contaminants thereon, a suitable indication can be obtained by an indicator actuated when the differential pressure across the filter reaches a predetermined value. Many types of such devices are available, in which the indicating means is actuated mechanically, or electrically, or by other means.

One simple and very successful type of indicating device is the magnetic pressure indicator of U.S. Pat. No. 2,942,572 to David B. Pall. In this device, a first magnetic means is arranged to attract a second magnetic means so long as the two means are separated by less than a predetermined distance. Bias means propels the second magnetic element to an indicating position whenever that distance is exceeded. The first magnetic means is movable reciprocably with a piston responsive to changes in pressure, and is normally biased towards the second magnetic means by a predetermined force. The second magnetic means is also movable reciprocably with a piston, and while retained toward the first means by magnetic attraction when close enough thereto, is normally biased in a direction away from the first means by a force capable of overcoming the force of magnetic attraction whenever the first and second means are separated by the predetermined distance. The magnitude of the force of magnetic attraction relative to the spring biasing force determines the predetermined pressure differential at which the device is actuated. Thus, the device can be arranged to be actuated at any required differential pressure, by simple adjustment of these forces.

In the usual form of this device, the second magnetic means so reciprocates as to project from the housing after actuation. In another form, the second magnetic means reciprocates to give an electric signal upon actuation. In either case, the device can malfunction if reciprocation of the second magnetic means is obstructed by dirt or rendered difficult by corrosion or wear. Moreover, substantial magnetic and spring-biasing forces are needed to ensure actuation at the desired differential pressure across the filter element, and to prevent false actuation due to accelerational or vibrational forces. The latter is particularly a problem when the device is to be used as a component in a moving vehicle, such as in an airplane, and the fluid system operates under fluid pressure of several thousand psi, as in the hydraulic system of the airplane. The dual reciprocable element design imposes limitations on the resistance of the device to false actuation under acceleration and on the size and weight of the device. For example, if the first magnetic means weighs 2 grams, and the second magnetic means weighs 10 grams, and both have optimally shaped ends, a maximum force of about 100 grams can be developed in the nonactuated position, at a wall thickness between the magnetic means of 0.025 inch, the approximate lower limit able to consistently withstand a 3,000 psi system operating pressure. The bias spring applied to the second magnetic means for optimum response to a predetermined fluid pressure differential can have a force of about 50 grams. This will permit a false actuation or reset by the force generated by an acceleration of 25 G in either axial direction. In practice, a resonably low weight assembly under 40 grams total weight cannot be made to resist the forces generated by accelerations greater than 20 G.

In accordance with the invention, a magnetic differential pressure indicator is provided which can be actuated at very low force levels, and which is less subject to malfuction, due to rotational rather than reciprocable actuation of the indicating means. The device features a rotatable magnetic indicating means, which upon reciprocation of the first magnetic means rotates about an axis into its indicating position.

The term "magnetic as used herein encompasses both materials that are permanent magnets and materials that are attracted by magnets, whether permanently or temporarily magnetizable thereby.

The device in accordance with the invention comprises a reciprocable magnetic means spaced from and arranged to attract or repel a rotatable magnetic means or keeper so long as the two means or the reciprocable means and keeper are within their mutual magnetic fields of force, the rotatable magnetic means normally being retained in a first position, first bias means to retain the reciprocable magnetic means towards or away from the rotatable magnetic means or keeper, and second bias means to rotate the rotatable magnetic means about an axis of rotation at an angle to the axis of reciprocation of the reciprocable magnetic means, from the first position to an indicating position, whenever the spacing between the two magnetic means is changed. The reciprocable magnetic means is movable with or is a piston, reciprocates from a first to a second position in response to changes in pressure, and is normally biased toward or away from the rotatable magnetic means or keeper by a predetermined force. The rotatable magnetic means is rotatable about an axis, and is retained toward the reciprocable magnetic means or keeper by magnetic attraction when close enough thereto, but is normally biased in a direction away from the reciprocable means or keeper by a force capable of overcoming the force of magnetic attraction to the reciprocable means or keeper whenever the two magnetic means or keeper are spaced by a predetermined distance.

The reciprocable and rotatable magnetic means can be magnets or attracted to magnets. The keeper is stationary, and is positioned therebetween, spacing them by a predetermined distance at least equal to the spacing dimension of the keeper, and can be a magnet or attracted by magnets, so that one at least of the magnetic means is attracted to the keeper. The other can be attracted to the keeper or other magnetic means, or repelled by the keeper or the other magnetic means.

At least one of the two magnetic means and keeper is a magnet. Preferably, two of these elements (in any combination) are magnets, and if desired, all three can be magnets, but three are not always as advantageous as two. In addition, the keeper can be of nonmagnetic material.

If the keeper is a magnet and the reciprocable and rotatable magnetic means are merely attracted thereto, the device functions because the reciprocable magnetic means when it moves away from or moves towards the keeper changes the magnetic field between the keeper and the rotatable magnetic means.

The keeper normally serves as the separating wall between the reciprocable and rotatable magnetic means, and prevents fluid communication between the spaces within which the reciprocable and rotatable magnetic means move. The keeper can be a piece fitted between these spaces, or an integral part of the housing defining such spaces. If the spaces are bores, usually coaxial, the keeper can close off and separate the two parts of the bore from each other, and define a pair of blind bores within which the two magnetic means move.

As the rotatable magnetic indicating means, there is preferably provided a ball or cylinder rotating about an axis disposed at an angle to the axis of reciprocation of the reciprocable magnetic means, and rotatable therewith is a magnetic means or keeper. The rotatable magnetic means is retained against rotation while the magnetic means or keeper thereon is magnetically attracted to the reciprocable magnetic means or keeper. Whenever the reciprocable magnetic means moves a distance away from the rotatable magnetic means or keeper sufficient to reduce the force of magnetic attraction and allow the spring-biasing force to overcome the magnetic attraction between the rotatable magnetic means and the reciprocable magnetic means or keeper, the ball or cylinder rotates, and gives a signal. The ball or cylinder preferably has a radius greater than the distance within which the magnetic means or keeper thereon is attracted by magnetic force to the reciprocable magnetic means or keeper.

The rotatable magnetic means can however assume other forms. It can for example be a simple bar magnet rotatably mounted at its center upon a pin or axle, rotating the poles at the ends of the bar into and away from the field of magnetic attraction of the reciprocable magnetic means.

Furthermore, the poles of the rotatable magnetic means can be spaced 180° apart, as in a bar, rotatable diametrically, or at a lesser angle, by placing the magnet chordwise across the circle of rotation described about the axis, or by bending the magnetic means to such an angle.

The rotatable magnetic means can be evenly balanced, with the axis of rotation at or near its center of gravity, so as to rotate freely and be stopped at any selected rotational position by magnetic attraction, or a bias means or a stop. It can also be loaded so as to come to rest at a selected rotational position by force of gravity. This can be done by placing the magnetic element, which is relatively heavy, in an appropriate nonradial or off-center position, or by placing it radially or diametrally, but at one side of the center, or with a larger portion on one side than on the other, in a blind bore, for instance.

In a preferred embodiment, the axis of rotation of the rotatable magnetic means passes through or very near to its center of gravity, so that the effect of vibration and acceleration forces is at a minimum, or zero, even when such forces are very large. The rotatable magnetic means can be fitted with a magnetic insert having a wedge or tapered form, or with a stepped shape, serving as a stop, so that when the reciprocable magent is moved through a predetermined axial distance, the rotatable magnetic means rotates through a predetermined limited arc. A differential pressure-indicating gauge can be obtained, with linear, logarithmic, or other stepwise relationship between the applied differential pressure and the reading, by appropriate geometry of the wedge or tapered or step-shaped magnetic insert, and of the reciprocable magnet, together with proper selection of the first and second bias means, and an indicating pointer for rotation with the rotatable magnetic means, or by inscribing lines on its surface.

If the rotatable magnetic means is well balanced about its axis, it can be made quite large, so as to be easily visible from large distances. A well balanced rotatable magnetic means can be held against rotation by a small magnetic force between it and the reciprocating magnetic means or keeper, and consequently the distance between them, and consequently the thickness of the keeper or septum can be relatively large, for example, 0.05 to 0.10 inch or more. The device can thus be used to detect small pressure differentials under very high system fluid pressures, extending the range of use of the device beyond that of the dual reciprocable magnetic means type of device by severalfold, in some applications.

In another embodiment, the rotatable magnetic means can be provided with electrically-conducting material over at least a part or all of its surface. One or more contacting electrodes can be provided to bear against the electrically-conducting surface. In one position, contact is made to complete an electrical circuit, while in the other, contact is broken. Thus, an electrical signal can be given of rotation of the rotatable magnetic means. An electric response can also be initiated to correct automatically the pressure condition that is thus indicated to exist.

The indication of rotation of the rotatable magnetic means can be visual, by coloring different segments of its surface different eye-catching colors, visible from outside the housing, or by rotating a needle or pointer indicator attached to the axle or pin around a dial or scale on the housing. The rotatable magnetic means can also be arranged to give an electric signal, by way of a lug on its surface engaging a switch, or by triggering a magnetic switch upon rotation of the rotatable magnetic means, which reverses or otherwise changes the position of its poles upon actuation. The electric signal can trigger a bell or a light, or effect a change in the fluid system, such as close a valve to cut off flow.

The reciprocable magnetic means can take any of several forms. It can, for example, be a piston, or part of a piston, as illustrated in the drawings, which can be in the form of a cylinder. It can also take the form of a piston or part of a piston of high surface area, such as a flexible disc or diaphragm, as shown and described, for instance, in U.S. Pat. No. 3,077,176, dated Feb. 12, 1963, to David B. Pall et al., or a bellows.

The rotatable magnetic means also can be in the form of a piston, or part of a piston, arranged to rotate about an axis at an angle to the axis of reciprocation of the reciprocable magnetic means. Preferably, the axis is perpendicular to the axis of reciprocation, but it can be within the range from about 30° to about 150° to such axis. It can be arranged to be visible from outside the housing for the indicator, for a visual indication. It also can be arranged upon rotation mechanically, electrically or magnetically to actuate a switch, as in U.S. Pat. No. 3,077,854 to David B. Pall, dated Feb. 19, 1963, or to move an indicator, such as a pointer, or magnetic fibers, either directly or magnetically. This can be done by providing a lug or stop rotated into actuating position.

The first bias means to retain the reciprocable magnetic means toward or away from the rotatable magnetic means or keeper can be the attractive or repulsive magnetic force between the reciprocable and rotatable magnetic means, thereby reducing the number of essential components in the system to three, the two magnetic means, and the bias means for the indicating portion. The first bias means also can take the form of a spring, a conical spring, or an annular disc spring, such as a Belleville spring. The second bias means to rotate the rotatable magnetic means can also be a spring, in this case, a torsion spring. The second bias means can also be a third magnet, as disclosed in U.S. Pat. No. 3,140,690, to M.P.L. Siebel, in which case a spring can optionally be included or omitted.

The drawings illustrate preferred embodiments of the invention.

FIG. 5 is a longitudinal section taken through the ball of FIG. 1 on the line 5—5 and looking in the direction of the arrows;

FIG. 6 is a view in longitudinal section through another embodiment of the pressure indicator of FIG. 1, in which the ball indicating means has a stop arranged to actuate a switch.

The pressure indicator of FIGS. 1 to 5 comprises reciprocable magnetic element 1 and rotatable magnetic element 2, mounted on opposite sides of a separating wall or keeper 3 of magnetic material within a housing 4, of nonmagnetic material. Elements 1 and 2 are positioned adjacent the wall or keeper 3, with magnetic poles opposed, so that each is drawn toward the wall by the resulting force of magnetic attraction therebetween. Preferably, the magnetic element 1 is composed of permanently magnetized metal, such as Alnico VI, Alnico VIII, or ceramic magnetic material or the like. Magnetic element 2 like element 1 may be formed of permanently magnetized metal, but it also may be formed of a suitable magnetic material such as iron, for example. Wall 3 is formed of a suitable magnetic material such as iron, for example.

Figure 1:
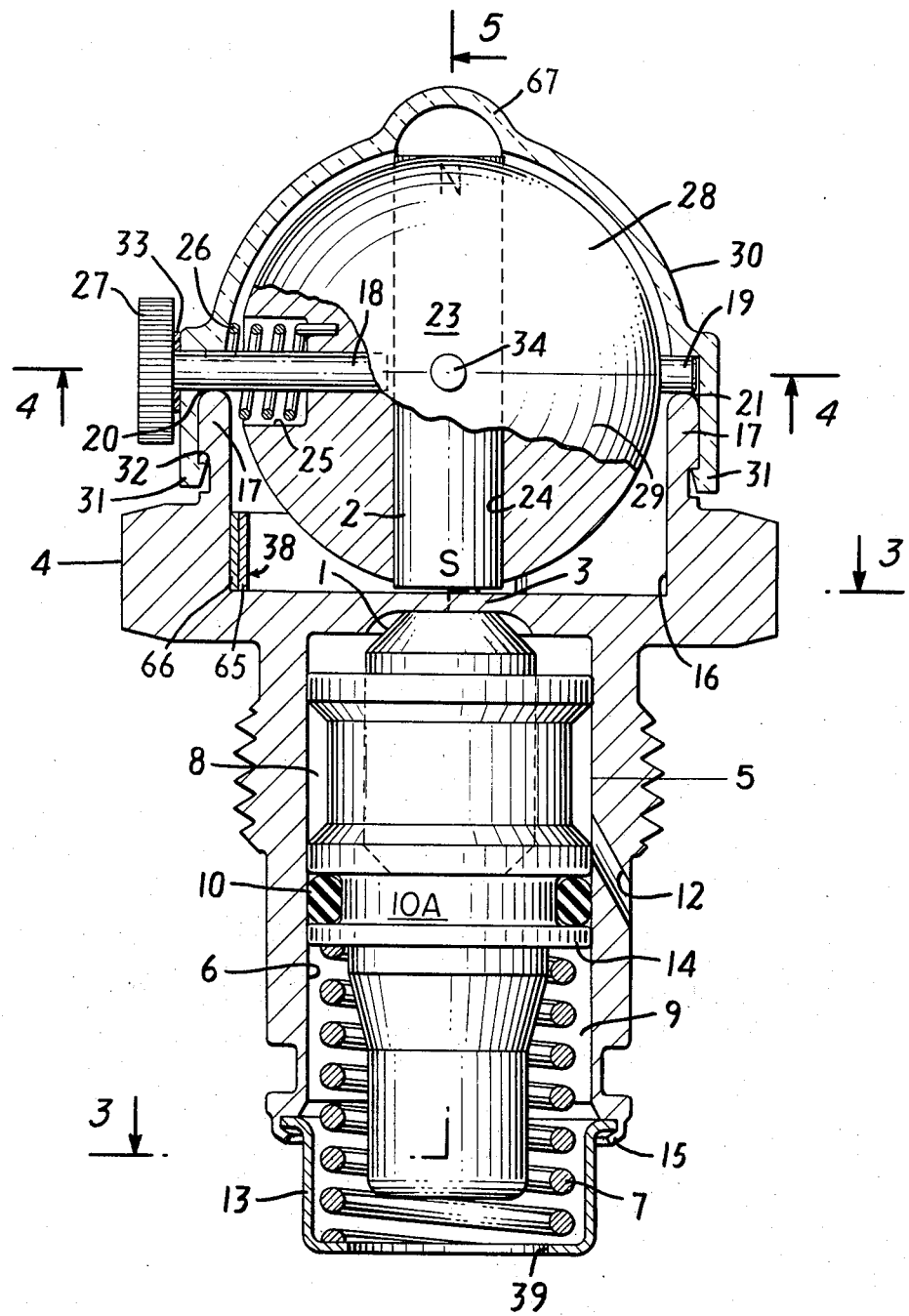
FIG. 1 is a view in longitudinal section taken through a typical pressure indicator according to the invention, in which the indicating device is in the form of a ball having a colored quadrant arranged to be visible from outside the housing within which the device is disposed, and showing the pressure indicator in a nonactuated position.

Mounted in a tubular piston 5, as shown by phantom lines in FIG. 1, magnetic element 1 is slidably supported in a cylindrical bore 6 in the housing 4, and is urged toward the wall or keeper 3 by bias means 7 which, in this embodiment, is a coil compression spring. In order to prevent fluid from passing from the annular chamber 8 at one end of the bore 6 to the space 9 at the other end, a liquid-tight seal is provided between the bore 6 and the piston 5 by a O-ring 10 of Teflon or other suitable gasketing material, captured within the circumferential groove 10A of the piston.

The coil spring 7 is selected according to the desired actuating pressure to permit the piston 5 to move away from wall 3 in the bore 6 whenever the pressure at the upper end of the piston 5 exceeds the pressure at the other end by an amount equal to the actuating differential pressure.

In this embodiment of the invention, the pressure indicator is arranged to measure the pressure drop across a pressure-influencing component, such as a filter (not shown, but illustrated in U.S. Pat. No. 2,942,572). Thus, fluid under pressure is applied to the component such as a filter via an inlet line (not shown) and emerges on the other side of the component through an outlet line (not shown). The bore 12 in the housing 4 is in fluid-flow connection with the inlet line, and communicates fluid pressure in the inlet line to the annular chamber 8 at one side of the piston 5, while the space 9 at the other end of the piston 5 is in fluid pressure communication with the outlet line via port 39. The difference in pressure between the inlet and outlet lines is a measure of the pressure drop across and therefore the clogging of the filter or other pressure-influencing component, and the different pressures are thus communicated to opposite sides of the piston 5.

If desired, in order to prevent dirt carried by the incoming fluid from blocking the bore 12, and/or chamber 8, possibly obstructing movement of the piston, a suitable annular filter element can be inserted over the outside of the housing 4 across the bore 12 as shown for instance in FIG. 1 of U.S. Pat. No. 2,942,572, dated June 28, 1960, to David B. Pall.

For ease in assembling the piston 5, the bore 6 has its open end closed off by the cap 13, and the base of the spring 7 is retained by the cap against the abutment 14 of piston 5. The cap is permanently retained to the housing 4 by the flange 15.

The wall or keeper 3 is an integral part of the housing 4 and defines the lower end of second bore 16 of the housing 4. The bore 16 is coaxial with the bore 6.

Secured to the housing 4 across the top edge of upstanding peripheral wall 17 of the bore 16 are pins 18, 19 which rotate in and are retained in sockets 20, 21 defined by the top of wall 17 and cap 30. Cap 30 is of transparent plastic, and has an internally flanged rim 31 engaging over external flange 32 of the housing 4.

Fixedly mounted on the pins 18, 19 preferably with an axis of rotation at its center of gravity, and rotatable therewith, is ball 23 of nonmagnetic material, in this case, plastic such as nylon or Teflon. The ball has a through diametral bore 24 in which is fitted in a press-fit the magnetic element 2, both ends of which project slightly from the bore beyond the surface of the ball. The bore 24 is perpendicular to the axis of the pins 18, 19 so that the magnetic element 2 rotates about the axis of the pins. Fixed in diametral socket 25, coaxial with pin 18, is a torsion spring 26. A knob 27 at the end of pin 18 facilitates manual rotation of the pin and ball 23, to reset the indicator after actuation, as will be seen presently. Dust seal ring 33 of silicone or Teflon felt prevents entry of contaminants through the socket 20 past the pin 18 into socket 25 and the interior of the bore 16. The torsion spring tends to rotate the ball 23 and magnetic element 2 away from the keeper 3 into the position shown in FIG. 2, but the magnetic element 2 and ball 23 are normally held in the position shown in FIG. 1 by the magnetic attraction to keeper 3 and magnetic element 1. The attractive force between these elements is sufficient to do so, so long as the adjacent ends of the magnetic elements 1 and 2 are separated by less than a predetermined distance, for example, one-sixteenth of an inch. Whenever the magnetic element 1 is moved away from the element 2 so that their adjacent ends are separated by more than one-sixteenth of an inch, however, the decreased force of magnetic attraction resulting therefrom is overcome by the force of the spring 26, and the ball 23 and element 2 are rotated away from the wall 3, into the position shown in FIG. 2.

The two surface halves 28, 29 of the ball 23 can be colored differently, in eye-catching colors, such as 29 orange and 28 green. Then, the observer can see through cap 30 when the device has been actuated, because the orange color of half 29 is showing, as in FIG. 2.

In order to prevent the ball 23 and magnetic element 2 from being rotated in a full 360°, and returning to the starting position, upon actuation, a stop pin 34 projecting from ball 23 engages a ledge 37 on the internal wall of bore 16 (as best seen in FIG. 5). When the ball has rotated 180°, the stop pin 34 strikes ledge 37, as seen in dashed lines in FIG. 5, and the ball is held there, stopping rotation at the 180° point.

In the nonactuated position of the ball 23, the pin 34 also rests on the ledge 37 but on the other side of the bore 16, as seen in dashed lines in FIG. 5. The ridge 67 projecting outwardly on cap 30 provides the clearance for the arc movement of pin 34 from one position on ledge 37 to the other, upon actuation of ball 23 and restoration to its normal position.

A conventional bimetallic element 38 is biased against the inside wall at the end of bore 16, retained there by its own spring force. The bimetallic element 38 is preferably comprised of two arcuate inner and outer strip portions 65, 66 joined together, for example, by a weld, and both arranged to bend inwardly with decreasing temperatures. At normal temperatures, element 38 has a minimum radius greater than that of the ball 23, and permits the ball 23 to rotate freely in bore 16 on actuation. However, at temperatures below a preselected value, at which for example the fluid to be filtered increases appreciably in viscosity, for example, 33°F. to 62°F., the element 38 contracts inwardly, so that the inner strip 65 extends just within the recess 69 on the ball, thus engaging the edge of the recess, and preventing rotation of the ball upon actuation of the pressure sensing magnetic element.

In operation, fluid pressure in the inlet line is communicated via the duct 12 to the space 8 of the cylindrical bore 6, urging the magnetic element 1 and piston 5 away from wall 3 against the force of the spring 7 and the pressure from the outlet line, communicated to space 9 via port 39. Whenever the difference between the inlet and outlet pressures is greater than the force of the spring 7, the piston 5 is driven away from wall 3 in the bore 6. After the magnetic element 1 is moved to a position more than one-sixteenth of an inch away from the magnetic element 2, the attractive force therebetween is less than the force of the spring 26, and the magnetic element 2 is rotated away from the wall 3 until the orange surface 29 of ball 23 shows through the cap 30, and the pin 34 engages stop 37, so that the ball 23 is held firmly in the actuated position shown in FIG. 2 by torsion spring 26.

The ball 23 in this position indicates that the pressure difference is greater than the predetermined value in accordance with which the spring 7 has been selected.

As an example, the spring 7 may be arranged to permit the magnetic element 1 to be driven away from the wall 3 whenever the pressure difference exceeds 35 psi, and thus give a signal.

Figure 2:
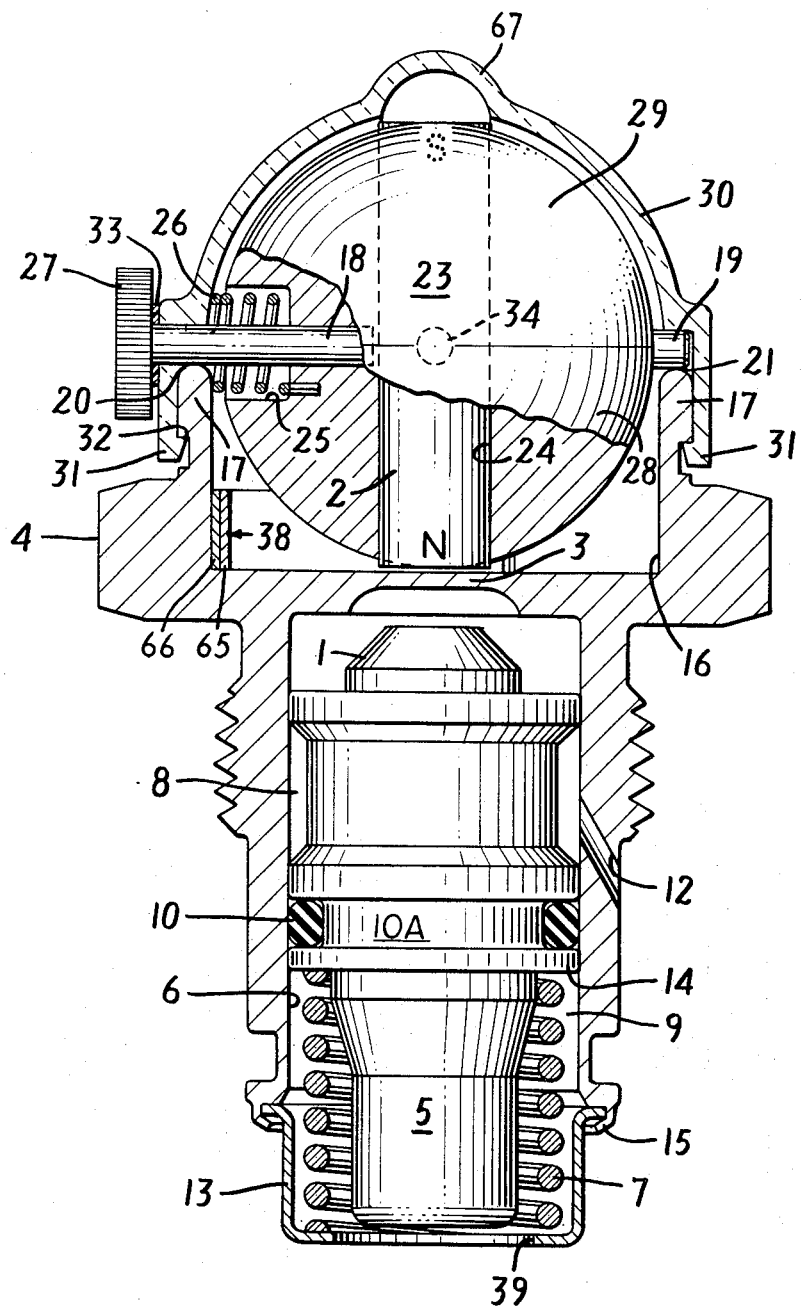
FIG. 2 is another view in longitudinal section taken through the pressure indicator of FIG. 1, and showing the device in the actuated position.
Figure 3:
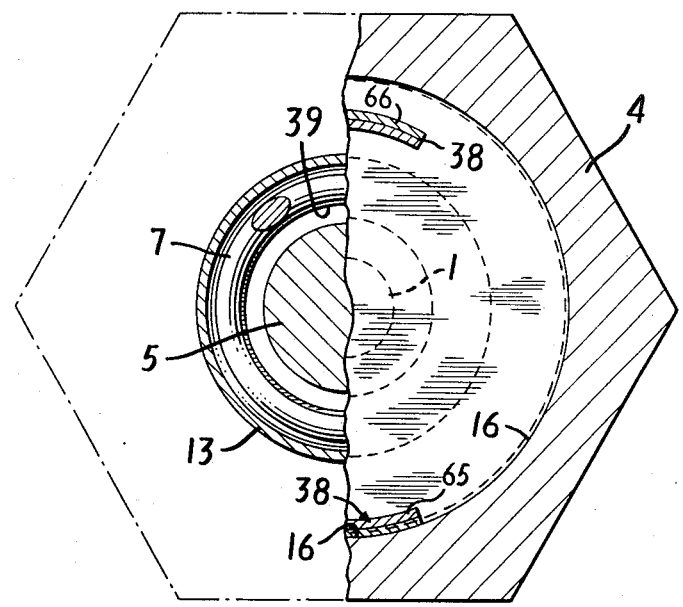
FIG. 3 is a cross-sectional view taken on the line 3—3 of FIG. 1 and looking in the direction of the arrows.
Figure 4:
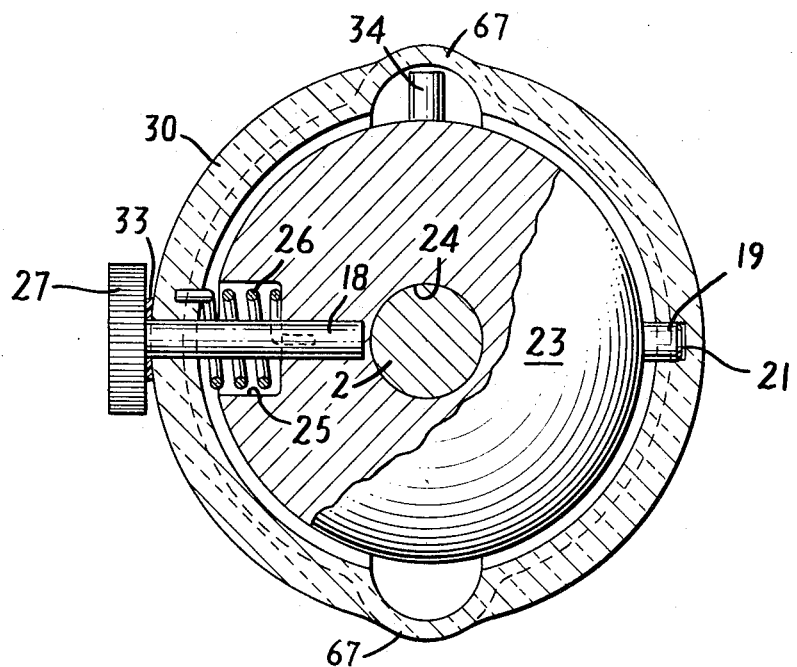
FIG. 4 is a cross-sectional view taken on the line 4—4 of FIG. 1 and looking in the direction of the arrows.

It will be apparent from FIG. 2 that the knob 27 permits rotation manually of ball 23 to return stop pin 34 to the other side of stop 37 and reset the magnetic element 2 to its original position, shown in FIG. 1. If after piston 5 has been returned to its starting position, shown in FIG. 1, the knob 27 be rotated 180° to return the ball in its original position, the ball 23 is retained in that position (shown in FIG. 1) by the magnetic element 2, which is attracted to the keeper 3. However, if piston 5 has not been returned to its original position, the device cannot be reset, because the magnetic element 2 is not attracted to the wall or keeper 3 by a force greater than the biasing force of spring 26, and the magnetic element 2 can be held in this position only while it is retained there manually. As soon as the manual force is removed, the ball 23 returns to the indicating position shown in FIG. 2, under the force of the spring 26. As a practical matter, therefore, resetting cannot be accomplished while the fluid system is still in use, which means that the indicator will continue to give an indication of the need for changing the filter element or other component until in fact the filter element or component has been changed.

At temperatures below 32°F., for example, the bimetallic element 38 contracts, to move the inner strip portion 65 of the bimetallic element 38 into the recess 69 of the ball 23. Thus, if the ball 23 and the magnetic element 2 seek to rotate away from the wall 3 under a differential pressure exceeding the biasing force of spring 7, resulting from increased viscosity of the fluid, at this low temperature, the inner strip portion 65 of the bimetallic element 38 intercepts the ball at recess 69, preventing a false indication of, for example, filter clogging. In the pressure indicator shown in FIG. 6, the ball and magnetic element are adapted to actuate an electrical signal, which, by choice of the appropriate electrical circuits, in any conventional manner, can be adapted for example to shut off flow or to give a warning signal.

The indicator comprises a housing 40 with two magnetic elements 41 and 42, mounted on opposite sides of the wall or keeper 43. The magnetic element 42 is mounted in a through diametral bore 36 on ball 35. A contact lug or button 44 is mounted in nonradial blind bore 45 beside the magnetic element. The ball is rotatably mounted on pins 46, 18 within recess 56 of the housing.

To provide an electrical signal upon actuation of the indicator, a switch 50 is mounted in a housing 51, which as shown is a part of the indicator housing 40, but need not be. Mounted on the switch is a lever 53 pivotally supported at 54 with one end 55 projecting into the recess 56 of the housing, to a point abutting but not touching the ball 35, in the arc of rotation of lug or button 44. Positioned above the lever arm 53, a switch actuator 60 in the form of a push button is movable by the lever arm 53 to actuate the switch 50 whenever the ball 35 rotates in the recess 56 so that lug or button 44 comes into contact with the end 55 of the lever arm 53, moving the arm 53 against push button 60. To provide a remote indication of the actuation of the indicator, suitable conductors 61 from the switch 50 are arranged in any conventional manner to complete appropriate electrical circuits whenever the switch is actuated.

In operation, a source or inlet of high pressure is connected through a duct (not shown) to the space 62 at the top of the cylindrical bore 63, urging the magnetic element 41 and piston 47 away from wall 43 against the force of a spring (not shown), as in the device of FIGS. 1 to 5. The space beyond the piston 47 can be connected to the outlet line (in which case the device acts in response to differential pressure) or to the atmosphere, or to a vacuum. Whenever the difference between the pressures on opposite sides of the piston 47 is greater than the force of the spring, the piston 47 is driven away from wall 43 in the bore 63. Whenever the magnetic element 41 has been driven more than one-sixteenth of an inch from the wall 43, the indicator and switch will actuate. The magnetic element 42 and ball 35 will be rotated by torsion spring 64 away from the wall 43 until the button or lug 44 abuts the end 55 of lever arm 53, thus moving the arm against the push button 60, and actuating the switch.

At the same time as the switch 50 is actuated, the differently colored segment 49 of ball 35 comes into view, and also gives a visual signal of the actuation of the indicator, and the other pole of element 42 is attracted to the wall or keeper 43 with sufficient force to hold the element 42 against the wall 43, and thus retain the ball 35 and lug 44 in actuated position.

In the embodiments shown in the drawings, the magnetic elements 1 and 2 or 41 and 42 are arranged so as to attract each other, with opposed poles. An equivalent result can be obtained by arranging the elements 1 and 2 or 41 and 42 so as to be mutually repelling with like poles facing each other. This requires only a small modification of the structure shown, that would be obvious to anyone skilled in this art with a knowledge of magnetic principles, using the principles of this invention as discussed above.

The ball can also be arranged to actuate a magnetic switch such as a reed switch without opening housing cap 30. In this case, the magnet 42 can either attract or repel a magnetic switch arm which is positioned above the magnet 42. The magnet 42 if it extends all the way through the ball 35 as shown in FIG. 6 repels the switch arm in one position and attracts it in the other, and in one of these positions the arm actuates the switch.

Instead of providing the contact lug on the ball, as at 44 in FIG. 6, a camming surface can be provided on knob 27 to actuate a switch arm, and thus achieve actuation of the switch mechanically without having to enter the cover 30, in one position of the ball 35.

In the embodiment shown in FIGS. 1 to 6, the magnetic element 1 or 41 can be reversed, so that the south pole faces the south pole of magnetic element 2, or 42, and the element 1 or 41 relocated so that it is at the opposite end of the bore, in its normal position, with the spring 7 relocated to the opposite side of the piston, to bias it in the opposite direction. The pressure-sensing line connections 12 and 39 also have to be reversed, so that outlet line pressure is sensed via bore 12 and inlet line pressure sensed via port 39. Now, a pressure differential sensed by the piston 1 or 41 via bore 12 and port 39 tends to move the piston towards wall 3 or 43, repels magnetic element 2 or 42 away from wall 3 or 43, and eventually to an actuating position. In this type of embodiment of course elements 1 and 2 or 41 and 42 must both be magnets, unless wall 43 is a magnet of opposite polarity instead of element 2 or 42.

It will be understood that the devices shown are designed so that the higher pressure of the two pressures being sensed is communicated to the piston 1 or 41 via bore 12. When the magnetic elements are repelling, the higher pressure is communicated to the piston 1 or 41 via port 39.

In the embodiment shown in FIGS. 1 to 5, the housing 4 can also be of magnetic material, while wall 3, which as shown is of magnetic material, can also be of nonmagnetic material.

The tubular piston 5 and magnetic element 1 are shown in two pieces, but they can also be all in one piece, of magnetic material. The O-ring 10 can also be omitted, and the seal effected by close tolerances between the piston and bore.

The spring 7 instead of being retained by the cap 13 can also be retained by the housing in which the indicator is installed, in which event the cap can be omitted.

The wall or keeper 3 can also be press-fitted in a leak-tight fit across the housing to separate bores 6 and 16. The bore 16 need not be coaxial with the bore 6.

The two surface halves 28, 29 of the ball 23 can be colored in any eye-catching color. While orange and green are shown, the combinations of red and white can be used, as well as other combinations, as will be apparent.

Rotation of the ball 23, as shown, can be held to any desired degree of arc by appropriate location of pin 34 on the ball and the cooperating stop 37. Rotation can also be arrested at the 180° or any other position by a third magnet, in the wall of bore 16, which is arranged to attract and hold the magnet 2 in a desired position by a magnetic force stronger than that exerted by magnetic element 1 and keeper 3.

The pressure indicator of FIGS. 1 to 5 can be utilized to indicate a total pressure above atmospheric instead of a pressure differential by communicating port 39 opening to space 9 of bore 6 to the atmosphere. Similarly, an absolute pressure may be indicaced by connecting the port 39 and space 9 of bore 6 to a vacuum.

The terms "react with" and "reaction with" as used in the claims refer to the forces of magnetic attraction or repulsion between the reciprocable magnetic means and the rotatable magnetic means. The reciprocable magnetic means is spaced from and arranged to attract or repel and thereby react with the rotatable magnetic means so long as the two means are within their mutually reactive magnetic fields of force. The term "magnetic means" encompasses both magnets and magnetically attracted materials, and it will be understood that a keeper can be interposed therebetween, and that the keeper can be of magnetic or nonmagnetic material.

Having regard to the foregoing disclosure, the following is claimed as the inventive and patentable embodiments thereof:

1. A magnetic pressure indicator comprising, in combination, a reciprocable magnetic means spaced from and arranged to react with a rotatable magnetic means so long as the two means are within their mutually reactive magnetic fields of force, first bias means to retain the reciprocable magnetic means in a first position with respect to the rotatable magnetic means, the rotatable magnetic means being normally retained in a second position, and second bias means to propel the rotatable magnetic means about an axis of rotation at an angle to the axis of reciprocation of the reciprocable magnetic means, from the second position to an indicating position whenever the spacing distance between the two magnetic means is changed, the reciprocable magnetic means being reciprocable in response to changes in pressure, and normally biased in the first position with respect to the rotatable magnetic means by a predetermined force, and the rotatable magnetic means being normally biased by the bias means for rotation away from the reciprocable magnetic means by a force capable of overcoming the force of magnetic reaction with the reciprocable magnetic means whenever the two magnetic means are spaced by a predetermined distance.

2. A magnetic pressure indicator according to claim 1, in which the rotatable magnetic means is in the form of a ball, with a magnetic element diametrically disposed therein.

3. A magnetic pressure indicator according to claim 1, in which the rotatable magnetic means is in the form of a cylinder, with a magnetic element diametrally disposed therein.

4. A magnetic pressure indicator according to claim 1, in which at least one of the first and second bias means is a spring.

5. A magnetic pressure indicator according to claim 1, in which at least one of the first and second bias means is a magnet.

6. A magnetic pressure indicator according to claim 1, in which both the reciprocable and rotatable magnetic means are magnets.

7. A magnetic pressure indicator according to claim 1, in which one of the magnetic means is a magnet, and one is of magnetizable material.

8. A magnetic pressure indicator according to claim 1, in which the rotatable magnetic means is arranged so as to become visible after actuation.

9. A magnetic pressure indicator according to claim 1, having the rotatable magnetic means arranged so as to actuate a switch.

10. A magnetic pressure indicator according to claim 1, having a bimetallic means arranged to prevent movement of at least one of the first and second magnetic means at temperatures below a predetermined minimum.

11. A magnetic pressure indicator according to claim 1, in which the first and second magnetic means are separated by a wall, both of the magnetic means are of magnetizable material, and the wall is a magnet.

12. A magnetic pressure indicator according to claim 11, in which one of the first and second magnetic means is a magnet and the wall is a magnet.

13. A magnetic pressure indicator according to claim 1, in which the reciprocable and rotatable magnetic means are mutually attracting.

14. A magnetic pressure indicator according to claim 1, in which the reciprocable and rotatable magnetic means are mutually repelling.

15. A magnetic pressure indicator according to claim 1, in which the rotatable magnetic means carries a stop means operatively engaging a stop member limiting rotation of the rotatable magnetic means to a predetermined arc.

16. A magnetic pressure indicator according to claim 15, in which the predetermined arc is approximately 180°.

17. A magnetic pressure indicator according to claim 1 in which the reciprocable magnetic means is spaced from and arranged to attract the rotatable magnetic means and the first bias means is arranged to retain the reciprocable magnetic means in a position towards the rotatable magnetic means.

18. A magnetic pressure indicator according to claim 1 in which the reciprocable magnetic means is spaced from and arranged to repel the rotatable magnetic means and the first bias means is arranged to retain the reciprocable magnetic means in a first position away from the rotatable magnetic means.

19. A magnetic pressure indicator according to claim 1 in which the reciprocable magnetic means and rotatable magnetic means are each spaced from and arranged to attract a keeper and the first bias means is arranged to retain the reciprocable magnetic means in a first position towards the keeper while the second bias means is adapted to propel the rotatable magnetic means away from the keeper.

20. A magnetic pressure indicator according to claim 1 in which the reciprocable magnetic means is spaced from and arranged to repel a keeper and the first bias means is arranged to retain the reciprocable magnetic means in a first position away from the keeper while the rotatable magnetic means is arranged to attract the keeper and the second bias means is arranged to propel the rotatable magnetic means away from the keeper.

* * * * *

PO-1050
(5/69)

UNITED STATES PATENT OFFICE
CERTIFICATE OF CORRECTION

Patent No. 3,815,542                  Dated June 11, 1974

Inventor(s) Roydon B. Cooper

It is certified that error appears in the above-identified patent and that said Letters Patent are hereby corrected as shown below:

| | |
|---|---|
| Column 2, line 10 | : "malfuction" should be --malfunction--. |
| Column 2, line 15 | : "magnetic should be --"magnetic"--. |
| Column 3, line 38 | : "diametrically" should be --diametrally--. |
| Column 3, line 62 | : "magent" should be -- magnet-- |
| Column 10, line 43 | : "indicaced" should be -- indicated--. |
| Column 11, claim 2, line 20 | : "diametrically" should be --diametrally--. |

Signed and sealed this 21st day of January 1975.

(SEAL)
Attest:

McCOY M. GIBSON JR.
Attesting Officer

C. MARSHALL DANN
Commissioner of Patents